Dec. 26, 1950  L. A. GRAHAM  2,535,409
VARIABLE-SPEED TRANSMISSION
Filed June 5, 1948  3 Sheets-Sheet 1

INVENTOR.
Louis A. Graham
BY John W. Michael
ATTORNEY

INVENTOR.
LOUIS A. GRAHAM
BY John W. Michael
ATTORNEY

Dec. 26, 1950   L. A. GRAHAM   2,535,409
VARIABLE-SPEED TRANSMISSION

Filed June 5, 1948   3 Sheets-Sheet 3

INVENTOR.
LOUIS A. GRAHAM
BY John W. Michael
ATTORNEY

Patented Dec. 26, 1950

2,535,409

UNITED STATES PATENT OFFICE 2,535,409

VARIABLE-SPEED TRANSMISSION

Louis A. Graham, Milwaukee, Wis., assignor to Graham Transmissions, Inc., Milwaukee, Wis., a corporation of Wisconsin Application June 5, 1948, Serial No. 31,245

13 Claims. (Cl. 74—796)

This invention relates to improvements in variable speed transmissions of the type employing a group or assembly of inclined longitudinally tapered planetary rollers intermediate the drive and driven shafts and a non-rotatable encircling contact ring adjustable lengthwise with respect to the rollers to regulate the planetary action and thus vary the speed and direction of rotation of the driven shaft.

This application is a continuation in part of and substitute for my co-pending application Serial No. 743,744 filed April 25, 1947.

Transmissions of this character are well known in the art, but it has heretofore been assumed necessary to employ a roller mounting providing freedom of outward movement to obtain the desired contact pressure between the roller and ring. In some of the prior art devices each end of the roller was carried by bearings slidable along the inclined roller axis to move the roller outwardly into contact with the ring when the roller was acted on by centrifugal force which could be augmented by spring pressure. In other transmissions of this type the rollers were mounted at their small ends in bearing or fulcrum supports usually in the form of spherical or self-aligning bearings or universal joints or the like which permitted of universality of motion and with an additional bearing at the large end of each roller radially slidable in a slot in the carrier or otherwise restrained in its lateral displacement. The former type of transmission may be seen in patents to Schmitter, 2,203,635, while patents to Gibson, 1,887,505, Madle, 2,315,067, and Graham, 2,319,319, disclose examples of the latter type.

Transmissions having the large end of the roller radially slidable in a slot in the carrier required a high degree of accuracy in manufacture thus giving rise to complications and difficulties. Due to the use of two bearings for each roller, it was necessary to bore the carrier at an incline at the small end of the roller and then insure that the slot or other guiding means at the other end of the carrier for confining the bearing block at that end to movement in a radial plane was central of that bore. Furthermore, the fulcrum point of each inclined bore had to be so selected as to bring the outer surfaces of the rollers parallel with the central axis at the point where the lateral extremities of the rollers defined a cylinder having a diameter equal to the bore of the control ring.

Jones in his Patent No. 2,405,957 shows a variable speed transmission of this type which is a simplification over the prior devices in that each roller is supported in the carrier at one end only, preferably its small end, in bearings of suitable capacity mounted in a block pivoted or hinged on the carrier on an axis at right angles to the common plane of the axes of rotation of the roller and the carrier. This constrains the roller movement to a radial plane while eliminating the need for bearings at the large end of the roller. This simplified and compact construction made possible savings in the cost of manufacture in addition to providing increased torque and power capacity and increased speed range for a transmission of the same length as prior devices.

I have discovered that a highly successful transmission of this character may be produced by supporting each roller in the carrier at one end, preferably its small end, in a support of simple construction easily produced, assembled and installed and which locks the roller in frictional contact with the control ring under all conditions. A transmission constructed according to my invention employs considerably fewer parts while achieving better operating characteristics than any of the prior art devices.

It is, therefore, the main object of the present invention to simplify the construction of variable speed transmissions of the character referred to by reducing and simplifying the number of parts, eliminating special bearings, universal joints, and the like, and facilitating production and assembly of the device, reducing the cost thereof, and substantially increasing its capacity.

A further object of the invention is the provision of a bearing support for the rollers for a variable speed transmission of the character described which will permit roller rotation with and with respect to the carrier, but which fixes the bearing with respect to the carrier and locks the roller in contact with the control ring.

Another object resides in the provision of a variable speed transmission of the character described wherein the rollers are in contact with the control ring under starting as well as running conditions without requiring spring loading means.

A further object is to provide a transmission of the type described having new and simplified means for augmenting centrifugal force in obtaining the desired contact pressure between the rollers and the ring.

Another object is to provide a transmission of the character described which may be easily assembled.

Still another object is to provide a one-piece carrier for a variable speed transmission of the character described.

A still further object is to simplify, compact and improve throughout, the construction of a transmission of this type, lower the manufacturing cost, and increase its capacity and efficiency and its adaptability for long life and diverse application.

Other objects and advantages will be pointed out in, or be apparent from, the specification and claims, as will obvious modifications of the embodiments shown in the drawings, in which:

Figure 1:
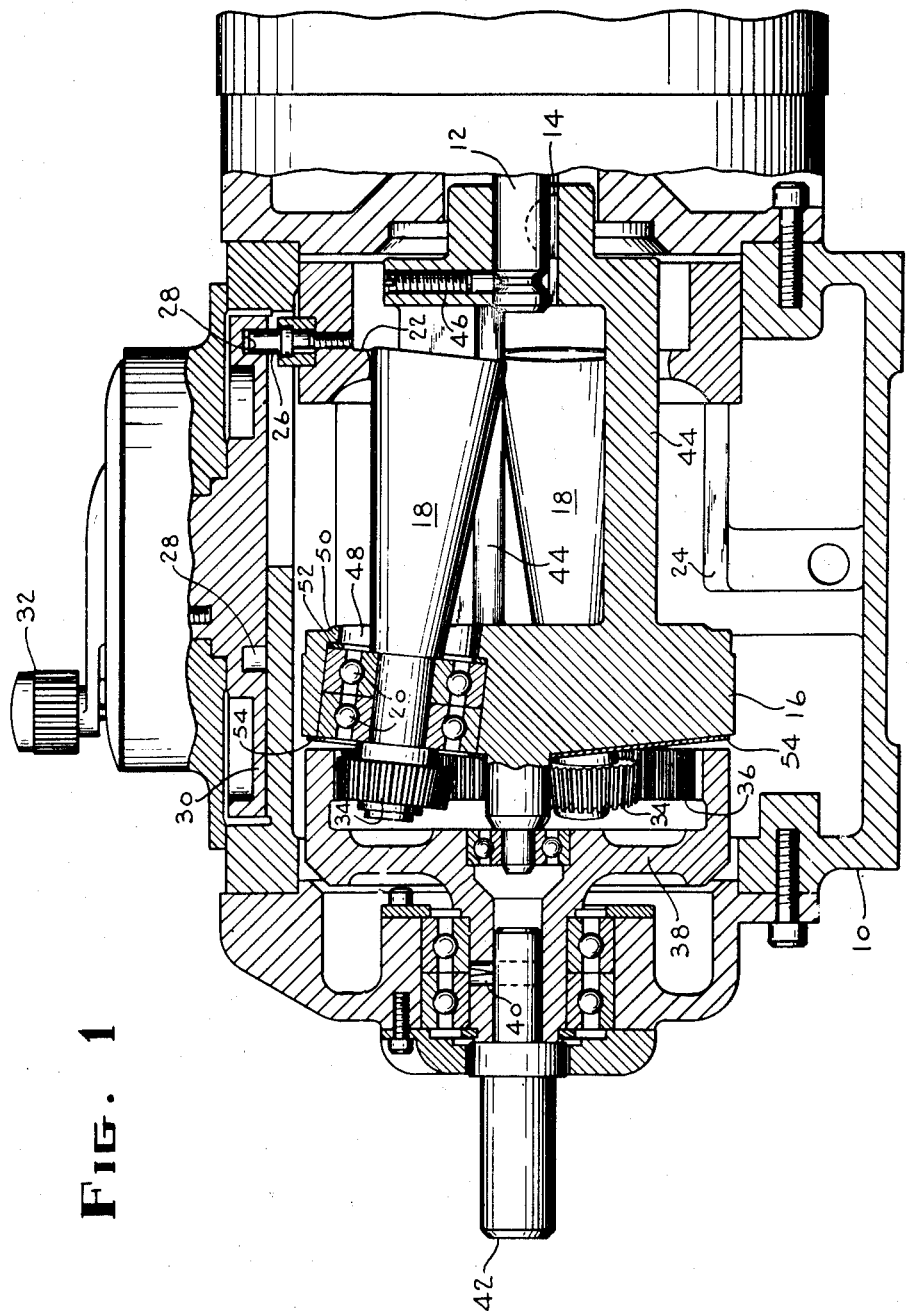
Fig. 1 is a vertical longitudinal section of a variable speed transmission embodying the present invention with an electric motor (broken away) connected thereto.
Figure 2:
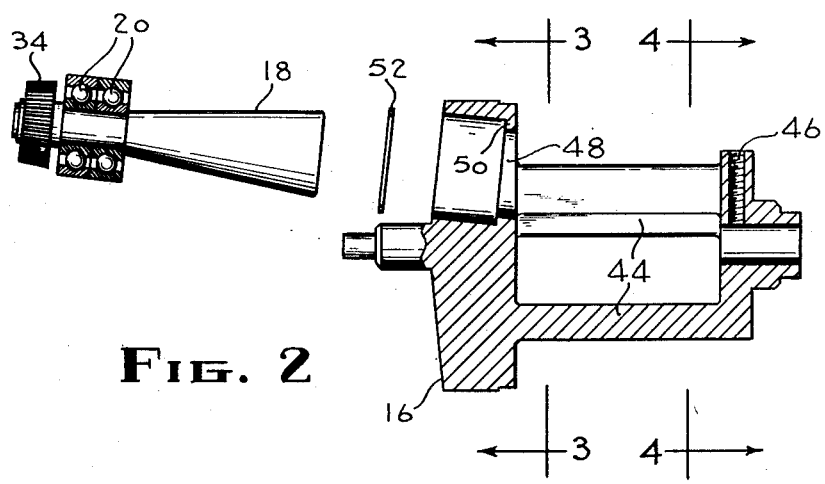
Fig. 2 is an exploded view showing the method of assembling a roller in the carrier.
Figure 3:
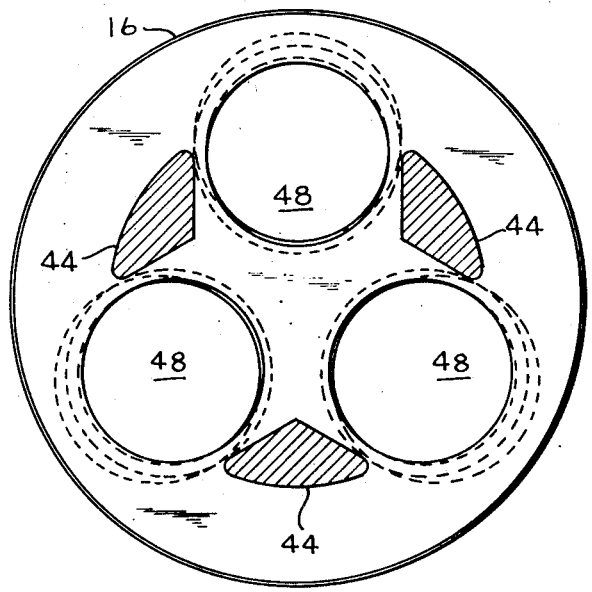
Fig. 3 is a sectional view of the carrier taken along line 3—3 in Fig. 2.
Figure 4:
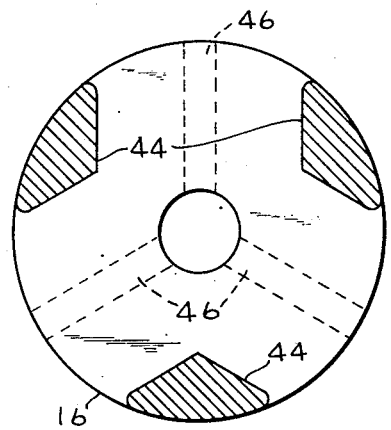
Fig. 4 is a view of the carrier taken along section line 4—4 of Fig. 2.

Referring in detail to Figs. 1-4, housing 10 encloses the variable speed transmission comprising drive shaft 12 keyed at 14 to rotary carrier 16 having three longitudinally tapered planetary rollers 18 mounted in anti-friction bearings 20 for rotation with and with respect to the carrier. The bearings are fixed in the carrier to maintain the rollers in contact with contact ring 22 at all times. Ring 22 slides in lands 24 on the inside of casing 10 and is restrained from rotational movement and its axial movement is controlled by pin 26 engaging ring 22 and slidable in spiral slot 28 cut in the bottom of plate 30 rotatable by crank handle 32.

As the control ring 22 is moved from the large to the small end of the roller, the rotational speed of the roller with respect to the carrier is increased so that pinion gear 34 mounted on the small end of the roller drives ring gear 36 at speeds varying from maximum through zero and into reverse. Spider 38 carrying ring gear 36 is pinned at 40 to driven shaft 42. It will be clear that drive shaft 12 rotates carrier 16 at a constant speed, and the position of ring 22 with respect to tapered planetary rollers 18 determines whether pinions 34 drive ring gear 36 and driven shaft 42 at maximum forward, maximum reverse, or some intermediate speed.

Carrier 16 comprises an integral, stress relieved casting having large and small disk-like heads connected by three longitudinal ribs 44 equally spaced about the carrier axis and being generally triangular in cross section. Radially disposed holes 46 in the small head and additional holes may be provided in the large head to receive different weights to compensate for any dynamic unbalance of the carrier.

Three inclined tapered holes 48 are equally spaced about the carrier axis and have shoulder 50 adjacent the inner face of the large head. It should be noted that the bore of the shoulder portion is greater than the largest roller diameter, and the larger diameter of hole 48 receives the outer races of the bearings. It will be evident that other bearings such as roller or needle bearings could be used in place of the ball bearings. It is preferred that the three holes be bored in a special jig to insure proper spacing and inclination. The number of rollers carried by the rotary carrier need not necessarily be three but may be varied so long as proper dynamic balance is maintained.

With the holes 48 formed in this manner the assembly of the rollers in the carrier is a simple matter. As may be seen in Fig. 2, the roller 18 may be passed through hole 48 until the bearing assembly, already mounted on the roller, abuts shoulder 50. In spite of close tolerances in manufacture, it may be that proper contact between roller 18 and ring 22 is not obtained. In this event the roller is removed from the carrier and shims (only one shim 52 is shown and this shim is of exaggerated thickness for the purpose of illustration) are inserted between shoulder 50 and bearing assembly 20 to move the roller to the left along its inclined axis and bring the roller into contact with ring 22. When proper contact is obtained, the bearing assembly is locked in place by face plate 54 secured to the outside face of the carrier head and abutting the outer bearing race.

From the above description it will be evident that this variable speed transmission represents a great simplification over the constructions previously employed. Since each roller is initially placed in contact with the ring and then locked in that position, the needed pressure between the roller and the ring is developed in exactly the same manner as if the bearings for the roller were free to move radially with respect to the carrier as in prior constructions. The centrifugal force acting on the roller is divided between the roller bearing and the ring in proportion to the distance of each from the center of gravity of the roller assembly, provided the roller initially contacts the ring. With this construction the carrier may be made integral, eliminating the plurality of parts heretofore used and requiring close tolerances.

Since the rollers contact the ring at all times, the transmission operates smoothly under starting as well as running conditions and is not subject to the objection to prior devices where the ring gear (and the output shaft) rotated at motor or input speed until the centrifugal force moved the rollers into contact with the ring, thus causing a jerk when starting up.

In addition to other advantages herein set forth, this greatly simplified transmission has an increased capacity, for a given length transmission, over prior devices having bearings at both ends since the working length of the rollers is increased.

Figure 5:
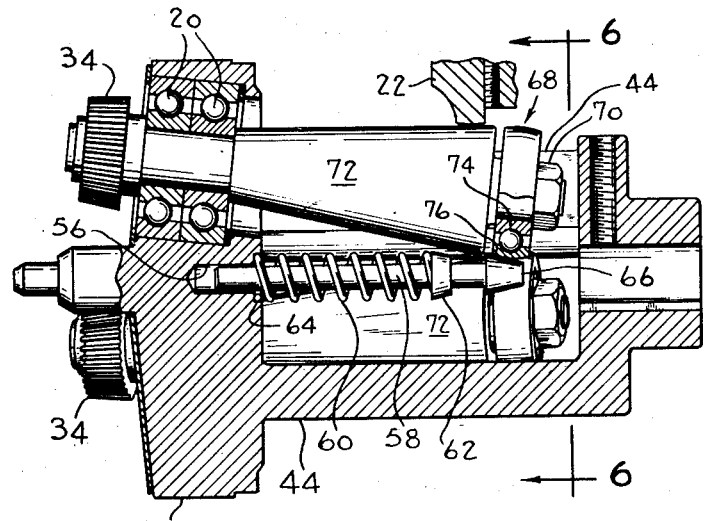
Fig. 5 is a vertical longitudinal section of a carrier with parts omitted to better show the means for spring loading the rollers.
Figure 6:
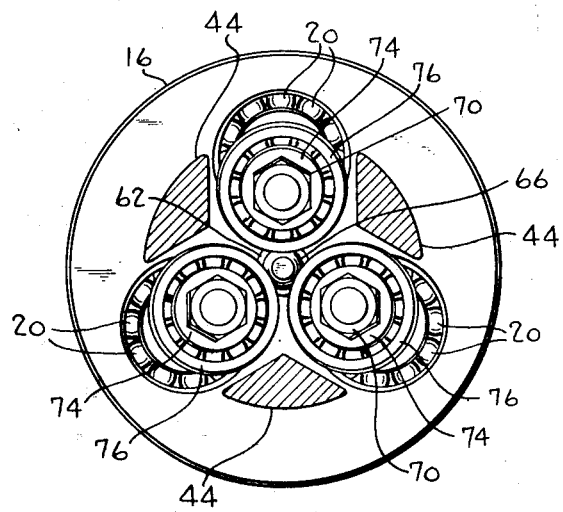
Fig. 6 is a section along line 6—6 in Fig. 5 showing the end view of the spring loaded rollers mounted in the carrier.

Referring now to the modification shown in Figs. 5 and 6, hole 56 is co-axial with the carrier axis and acts as a guide and support for rod 58 which is biased towards the right by spring 60 compressed between shoulder 62 and annular seat 64 in carrier 16. Frusto-conical wedge 66 on the end of rod 58 acts on each of the internal parts 68 of conventional external self-aligning ball bearings respectively mounted by means of bolts 70 on the free ends of the rollers 72 and comprising inner race 74 and outer race 76, the exterior of which is curved and allows proper contact between cone 66 and the bearings. The frusto-conical wedge tends to move the ends of the rollers outwardly with a force much greater than the spring force and augments centrifugal force to increase contact pressure between the rollers and the contact ring when the carrier is rotated in the same manner as in prior transmissions providing for outward roller movement.

This spring loaded construction is simple and readily assembled. The wedge always acts on all the rollers and is centered thereby. While the wedge profile could be arcuate and the exterior of outer race 76 flat, the combination shown is preferred since bearings illustrated are commercially available and the conical wedge may be readily machined. It is preferred that flat wedge and bearing surfaces be avoided since this may tend to bind shaft 58 in the axial direction. It should be understood that this spring loading construction may be employed in the prior art transmission providing for outward roller movement.

Various changes within the scope of the claims will be obvious from or suggested by the drawings and specification.

I claim:

1. A variable speed transmission including an input shaft, a rotary carrier joined to said shaft, a planetary roller, bearing means at one end only of said roller mounting said roller on said carrier for rotation therewith and with respect thereto while maintaining said carrier and said roller substantially fixed against relative axial displacement with respect to each other, and an axially movable rigid control ring encircling said roller, said bearing means being disposed in said carrier in position to hold said roller in frictional contact with said ring at all times.

2. In a variable speed transmission, a rotary carrier, an axially movable control ring, a bearing in said carrier, an inclined tapered planetary roller having one end mounted in said bearing and the other end free of said carrier, said roller being fixed in rolling contact with said ring by said bearing.

3. In a variable speed transmission, an axially movable control ring, a rotary carrier having a bearing therein, and a planetary roller having one end free of said carrier and being mounted in said bearing for rotary movement with respect to the carrier and fixed against radial movement with respect to the carrier.

4. In a variable speed transmission, a rotary carrier, an axially movable control ring, and a planetary roller in contact with said ring and having only one end mounted in said carrier, said roller being adapted for rotational movement with respect to said carrier and being fixed against radial movement with respect to the carrier.

5. In a variable speed transmission, a rotary carrier on a shaft and having a fixed bearing mounted therein with its axis inclined with respect to the shaft, a control ring adapted for axial movement with respect to the shaft, and a conical roller mounted in the bearing in frictional rolling contact with the ring and having one end free of said carrier.

6. In a variable speed transmission, a rotary carrier on a shaft and having a fixed bearing mounted therein with its axis inclined with respect to the shaft, a control ring adapted for axial movement with respect to the shaft, and a conical roller mounted in the bearing in frictional rolling contact with the ring and having one end free of said carrier, bearing means mounted on said free end, and spring actuated means mounted on the carrier acting on said bearing means to augment centrifugal force when the carrier is rotated and thereby increase contact pressure between the roller and the ring.

7. In a variable speed transmission, a rotary carrier, a plurality of planetary rollers, bearing means for mounting said rollers in said carrier for rotation with and with respect to said carrier, an axially movable control ring encircling said rollers, said bearing means being fixed in the carrier to lock the rollers in contact with the bore of said ring, and means acting on said rollers to augment the centrifugal force acting on said rollers when the carrier is rotated and to thereby increase the contact pressure between the rollers and the ring.

8. In a variable speed transmission, a rotary carrier, a plurality of planetary rollers, bearing means for mounting said rollers in said carrier for rotation with and with respect to said carrier, an axially movable control ring encircling said rollers, said bearing means being fixed in the carrier to lock the rollers in contact with the bore of said ring, and means acting on said rollers to augment the centrifugal force acting on said rollers when the carrier is rotated and to thereby increase the contact pressure between the rollers and the ring, said means comprising, wedging means lying on the carrier axis and being mounted in the carrier for movement along the axis thereof, means biasing the wedging means into contact with the rollers to exert a force on the rollers tending to move the rollers outwardly.

9. In a variable speed transmission, a rotary carrier, a plurality of planetary rollers, bearing means for mounting said rollers in said carrier for rotation with and with respect to said carrier, an axially movable control ring encircling said rollers, said bearing means being fixed in the carrier to lock the rollers in contact with the bore of said ring, and means acting on said rollers to augment the centrifugal force acting on said rollers when the carrier is rotated and to thereby increase the contact pressure between the rollers and the ring, said means comprising, an axially movable shaft having one end mounted in the carrier on the axis thereof, wedging means on the other end of the shaft and being adapted to tend to move the rollers outwardly while being centered by the rollers, and spring means acting to move the wedging means into contact with the rollers.

10. In a variable speed transmission, a rotary carrier, a plurality of planetary rollers, bearing means for mounting said rollers in said carrier for rotation with and with respect to said carrier, an axially movable control ring encircling said rollers, and means acting on said rollers to augment the centrifugal force acting on said rollers when the carrier is rotated and to thereby increase the contact pressure between the rollers and the ring, said means comprising, an axially movable shaft having one end mounted in the carrier on the axis thereof, wedging means on the other end of the shaft and being adapted to tend to move the rollers outwardly while being centered by the rollers, and spring means acting to move the wedging means into contact with the rollers.

11. In a variable speed transmission, a rotary carrier, an axially movable rigid control ring encircling said carrier, and a tapered planetary roller rotatably mounted in said carrier in fixed contact with said ring.

12. In a variable speed transmission, a rotary carrier, an axially movable rigid control ring, a bearing fixed in said carrier, and a planetary roller mounted at one end only in said bearing and held in contact with said ring by said bearing.

13. In a variable speed transmission, a rotary carrier, an axially movable control ring, a bearing fixed in said carrier, and a planetary roller mounted at one end only in said bearing and being maintained in contact with said ring by said bearing.

LOUIS A. GRAHAM.

REFERENCES CITED

The following references are of record in the file of this patent:

UNITED STATES PATENTS

| Number | Name | Date |
|---|---|---|
| 2,090,606 | Barish | Aug. 17, 1937 |
| 2,203,637 | Schmitter et al. | June 4, 1940 |
| 2,405,957 | Jones | Aug. 20, 1946 |